Jan. 4, 1938.                B. A. SWENNES                2,104,106
                           FRICTION CLUTCH PLATE
                            Filed Sept. 12, 1936
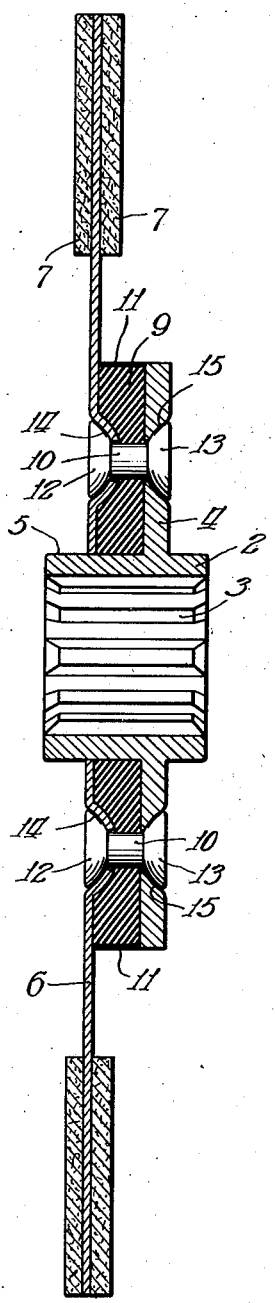
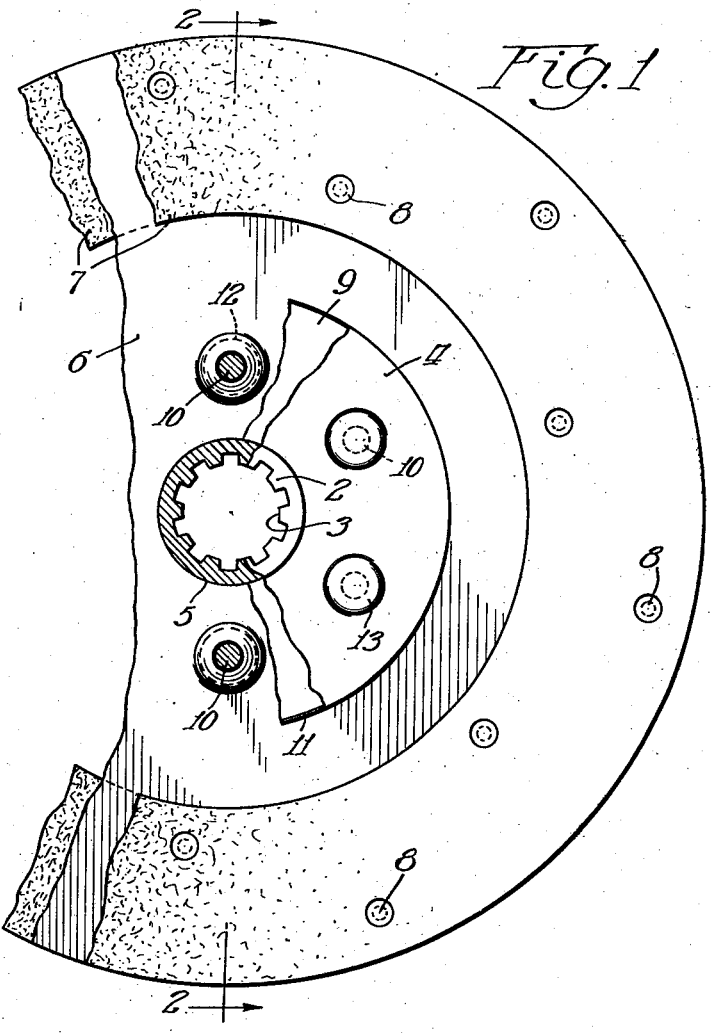
Inventor:
Benjamin A. Swennes
By: Edward C. Fritzbaugh
Atty.

Patented Jan. 4, 1938

2,104,106

UNITED STATES PATENT OFFICE 2,104,106

FRICTION CLUTCH PLATE

Benjamin A. Swennes, Rockford, Ill., assignor to Borg-Warner Corporation, Chicago, Ill., a corporation of Illinois Application September 12, 1936, Serial No. 100,508

6 Claims. (Cl. 192—68)

This invention relates to improvement in friction clutch plates and more particularly to clutch plates wherein a resilient cushion driving connection is employed to interconnect the friction facing supporting elements of the plate to the hub element whereby to dampen vibration otherwise transmitted through the plate.

The principal object of my invention is to provide an improved cushion drive connection between the friction facing supporting element and the hub assembly of a driven clutch plate whereby to provide a drive connection having high torque transmitting characteristics together with maximum vibration dampening property.

Another object is to provide a friction clutch plate of the character described, wherein resilient material, such as rubber, is employed to interconnect the friction facing supporting elements with the hub element of the plate and wherein the parts are so arranged as to place the rubber under compression during high torque transmitting function of the plate thus to increase the torque transmitting characteristics of the plate.

A further object is to provide an improved friction clutch plate, as described, which is simple in construction, which may be manufactured at relatively low cost and wherein manufacturing tolerances in dimensions are not of a critical nature.

Other objects, the advantages and uses of the invention will become apparent after reading the following specification and claims and after consideration of the drawing forming a part of the specification wherein:

Fig. 1 is a fragmentary end elevation of a friction clutch plate in accordance with my invention and Fig. 2 is a sectional view along the line 2—2 of Fig. 1.

With reference to the drawing I have selected for illustration therein, a clutch plate adapted for use in a motor vehicle engine clutch. The plate may comprise a hub member 2 having an internally splined portion 3 adapted to engage the splined drive shaft of a motor vehicle transmission. The hub 2 may be provided with an integral and radially extending flange 4 located on the outer cylindrical wall 5 thereof. Mounted concentrically about said hub, with its inner portion in overlapping relationship with said flange, is a sheet metal disk 6. The disk 6 may be provided with friction facing rings 7, fixed upon opposite sides thereof by rivets 8, for frictional engagement by a clutch driving assembly in a manner well known in the art.

An annular rubber cushion 9 is interposed between the opposed faces of the disk 6 and the hub flange 4 and bonded thereto by vulcanizing the rubber to the aforesaid faces. I prefer to copper plate the disk and hub flange faces before vulcanizing the rubber cushion thereto in order to effect a more efficient bond. With the cushion 9 fixed in place as described there is provided a resilient shear drive connection between the disk 6 and hub 2 permitting relative rotation of disk and hub within the limits of elasticity of the rubber, which drive connection is adequate for the transmission of torque below the shear point of the cushion. At 11 I have indicated a protective film of substance, such for example as is known in the trade as "DuPrene", for protecting the rubber cushion 9 from contact with any oil or other lubricant which might find its way into that part of the oil assembly in which the clutch plate is disposed.

In order, however, that the plate may possess high torque characteristic without impairing resiliency of drive during low torque transmission there is incorporated in the plate a means operable automatically to place the cushion 9 under compression during relative rotation of the disk and hub assembly, the degree of compression being determinable upon the degree of relative rotation. This means may comprise a plurality of tie bolts 10 each having, at its opposite ends, heads 12 and 13 respectively formed with spherical sidewalls. The heads 12 may contact with and lie within the confines of complementary spherical depressions 14 formed in the disk 6 and the heads 13 may lie within similar complementary depressions 15 formed in the flange 4. The shanks of the bolts may extend through the rubber cushion 9 as shown. In the plate illustrated, I have shown six such tie bolts 10 spaced at equal distances apart from one another, and in annular array circumferentially of the flange 4.

In operation upon occurrence of relative rotation between the disk 6 and hub 2, as during the transmission of high torque through the plate, the bolts 10 will be caused to drift from their normal positions parallel with the axis of the hub 2 to positions with their axes inclined relative to the axis of the hub. This movement of the bolts will cause the disk 6 and hub flange 4 to be moved relatively toward one another thus to compress the cushion 9 and in so doing to increase the torque-transmitting characteristics of the driving connection between disk and hub assemblies. The greater the deflection of the bolts 10 from their normal positions, the greater will be the compression of the rubber 7, and hence its ability to transmit torque without endangering the shear connection between the disk and flange maintained by the cushion 9. This function of the clutch plate is effective regardless of the direction of relative rotation between the disk 6 and hub 2 and is therefore just as effective during the period when the engine is driving the vehicle as when the engine is acting as a brake with the clutch engaged.

I claim as my invention:

1. A friction clutch plate comprising, a hub member, a metal disk having friction facings fixed upon its peripheral portion, a resilient cushion interposed between overlapping portions of said hub member and said disk and bonded permanently thereto whereby to establish a shear drive connection between the disk and hub, and means associated with the hub and the disk and responsive to relative rotational movement therebetween to place said cushion under compression thereby to increase the pressure between the cushion and the hub member and disk at the bonded interfaces thereof.

2. A clutch plate, as defined in claim 1, wherein said means comprises a plurality of rigid members connected with said disk and to said hub and extending through said cushion, said members being arranged to draw the disk and hub relatively toward one another as the members are shifted out of their normal positions by said relative rotation of disk and hub.

3. A friction clutch plate comprising, a hub member having a radial flange, a metal disk mounted concentrically on said hub member and having a portion in overlapping register with said flange, a rubber cushion disposed between the opposed faces of said hub flange and said disk and vulcanized thereto whereby to provide a shear driving connection between the disk and the hub, and means associated with the disk and with the hub flange and operable in response to relative rotation between said disk and hub to draw said disk and hub flange relatively toward one another thereby to place said rubber cushion under compression and to increase the pressure between the cushion and the hub member and disk at the bonded interfaces thereof.

4. A friction clutch plate, as defined in claim 3, wherein said means includes a plurality of tie bolts each engageable at opposite ends with said disk and hub flange respectively and each extending through said rubber cushion, the axes of said bolts being parallel with the axis of said hub but being shiftable angularly under the influence of relative rotation between the disk and hub to draw the disk and hub flange relatively toward one another.

5. A friction clutch plate comprising, a hub member, a metal disk mounted concentrically of the axis of said hub member, said hub member and said disk having overlapping portions spaced axially one from the other, a resilient cushion interposed between said overlapping portions and secured thereto to provide a shear drive connection between the disk and hub member, and a plurality of members each connected at one end to said disk and at the other end to said hub member, said plurality of members being so arranged relative to the disk and hub member as to draw their said overlapping portions toward one another in response to relative rotation of the disk and hub member thereby to increase the pressure between the cushion and the hub member and disk at the bonded interfaces thereof.

6. A friction clutch plate, as defined in claim 5, wherein said plurality of members have pivotal connections with the disk and hub member respectively.

BENJAMIN A. SWENNES.